(12) United States Patent
Choi

(10) Patent No.: US 9,846,355 B2
(45) Date of Patent: Dec. 19, 2017

(54) PORTABLE SCREEN COMBINED WITH ROTARY SUPPORT

(71) Applicant: Hae-yong Choi, Seoul (KR)

(72) Inventor: Hae-yong Choi, Seoul (KR)

(*) Notice: Subject to any disclaimer, the term of this patent is extended or adjusted under 35 U.S.C. 154(b) by 150 days.

(21) Appl. No.: 14/620,918

(22) Filed: Feb. 12, 2015

(65) Prior Publication Data

US 2016/0178995 A1 Jun. 23, 2016

(30) Foreign Application Priority Data

Mar. 4, 2014 (KR) ........................ 10-2014-0025263

(51) Int. Cl.
*G03B 21/56* (2006.01)
*G03B 21/58* (2014.01)
*G03B 21/604* (2014.01)

(52) U.S. Cl.
CPC ............ *G03B 21/56* (2013.01); *G03B 21/58* (2013.01); *G03B 21/604* (2013.01)

(58) Field of Classification Search
CPC ...... G03B 21/56; G03B 21/58; G03B 21/604; A45C 7/00; A45C 13/00; G06F 1/1633
USPC ......... 359/443; 248/459–460, 472, 528, 166, 248/174, 300
See application file for complete search history.

(56) References Cited

U.S. PATENT DOCUMENTS

| | | | | |
|---|---|---|---|---|
| 1,971,912 A * | 8/1934 | Horwath | ................... | G09F 1/04 248/459 |
| 2,062,878 A * | 12/1936 | Hammel | ................ | G03B 21/58 160/183 |
| 2,499,859 A * | 3/1950 | Halter | ................... | G03B 21/58 160/128 |
| 3,120,865 A * | 2/1964 | Ciofani | .................. | G03B 21/58 160/19 |
| 4,001,958 A * | 1/1977 | Fecko | ....................... | G09F 1/06 248/459 |
| 5,351,882 A * | 10/1994 | Krautsack | ............ | B65D 5/5206 206/45.26 |
| 2012/0008202 A1* | 1/2012 | Choi | ...................... | G03B 21/28 359/459 |

FOREIGN PATENT DOCUMENTS

JP EP 1887422 A1 * 2/2008 ............. G03B 21/58
KR 10-2008-0080749 8/2008

* cited by examiner

*Primary Examiner* — Christopher Mahoney
(74) *Attorney, Agent, or Firm* — Bacon & Thomas, PLLC

(57) ABSTRACT

A portable screen combined with a rotary supporter, which is used in a small projector or a mobile phone into which a projector is embedded. The support plate is provided with the rotary supporter and a rotating fixing plate so that the screen can be easily installed and carried. The material area can be reduced to ½ or less and cost for manufacturing can be reduced ½ or less based on the screen and further weight of the screen can be reduce ½ or less.

5 Claims, 9 Drawing Sheets

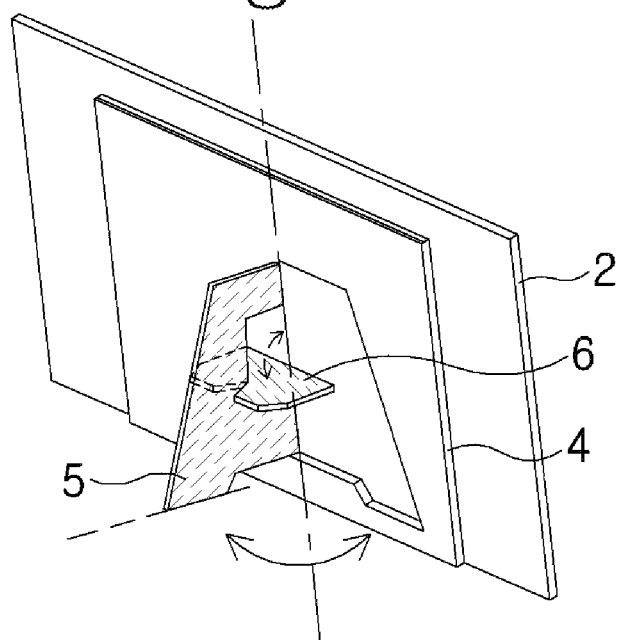

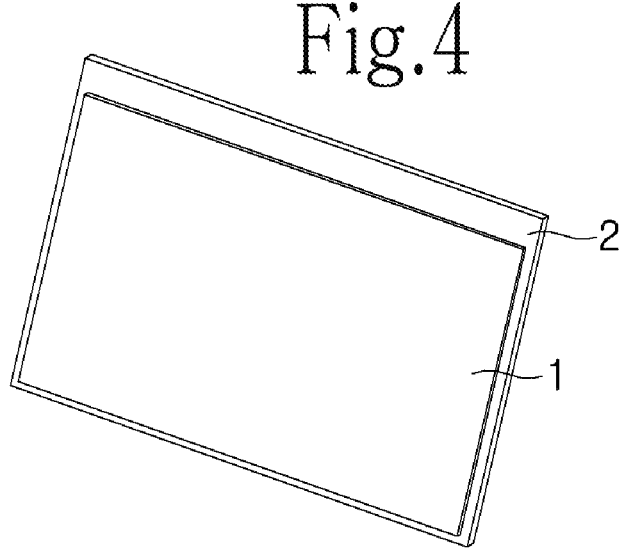

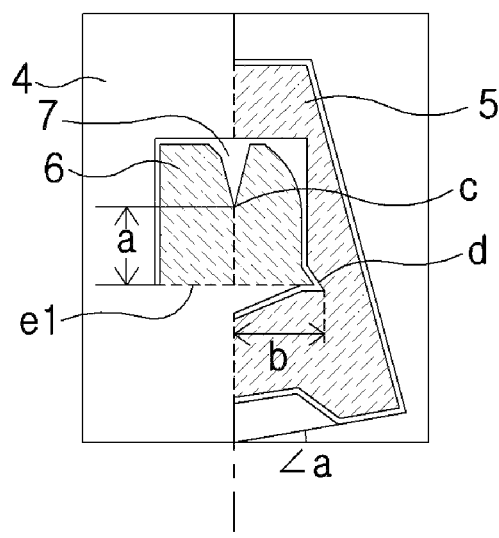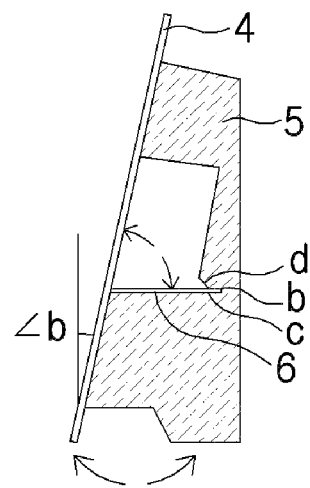

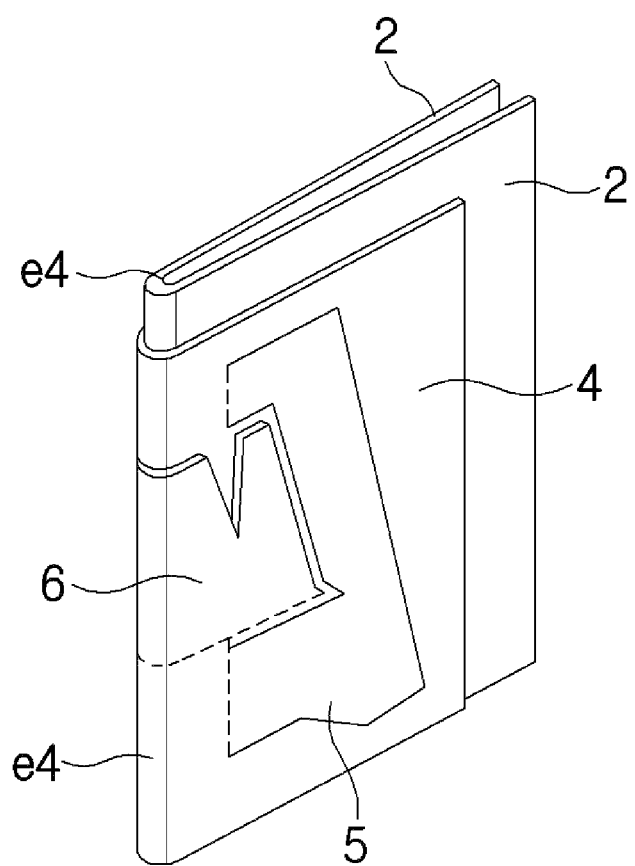

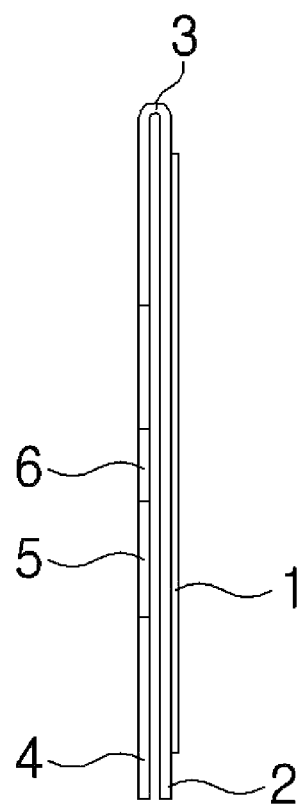

PORTABLE SCREEN COMBINED WITH ROTARY SUPPORT

CROSS-REFERENCE(S) TO RELATED APPLICATION

This application claims under 35 U.S.C. §119(a) the benefit of Korean Patent Application No. 10-2014-0025263 filed on Mar. 4, 2014, which is incorporated by reference herein in its entirety.

BACKGROUND OF THE INVENTION (a) Field of the Invention

The present invention relates to a screen for image projection, and more particularly, to a screen for image projection to which a horizontal rotation supporter and a vertical rotation supporter in a single plate type are combined.

(b) Description of the Related Art

In general, according to a related art of a screen for image projection, a structure for erecting a screen is complicated and weighted heavily and thus it is inconvenience to carry it.

Recently, a mobile phone into which a projector is embedded and a projector that is extremely smaller than a mobile phone are introduced into a market. These projectors are featured as transportability. A projector needs to be used with a screen for displaying an image.

However, the screen has to be erected to receive an image from a projector but it needs to be a thin film structure to carry it conveniently.

Further, according to a related art of Korean Patent Application No. 10-2008-0080749, which was filed by the present applicant, the structure of a screen is complicated and it needs to go through several procedures for erecting the screen and a large area of surrounding elements comparing to the area of the screen, thereby causing much cost of the material. Further, according to the related art, the weight of the screen is heavy and thus it is inconvenient to carry it and the screen is not stable after installment thereof.

Meanwhile, the conventional screen is prepared by using one color and thus it is not beautiful color and other materials having different colors cannot be used for the screen.

(Patent Document 1) Korean Patent Application No. 10-2008-0080749

The description provided above as a related art of the present invention is just for helping in understanding the background of the present invention and should not be construed as being included in the related art known by those skilled in the art.

SUMMARY OF THE INVENTION

The present invention has been proposed to solve the above drawbacks and one object of the present invention relates to provide a portable screen combined with rotary supporter, and the screen of the present invention will satisfy the below conditions.

That is, the screen is provided mainly to a portable projector as a bundle and thus it needs to be manufactured simply, cost to be low and mass production thereof to be possible.

Further, the screen needs to be erected simply when it is used in a state of erection and to be folded simply when it is carried, and further to be weight-lighted and to be stable when the screen is erected.

Meanwhile, the screen needs to be prepared by combining various materials so as to form beautiful color structure thereof.

Finally, the screen needs to have a polarization reflection function for a 3D image.

According to one aspect of the present invention, a portable screen combined with a rotary supporter is configured as followings.

A rotary supporter that rotates left/rightward by a bending line is provided on a flat plate such as a plastic sheet and a rotation fixing plate that rotates vertically is provided inside the rotary supporter wherein the rotation fixing plate is connected and disconnected through a groove formed inside the rotary supporter.

In more detail, the support plate is provided on a rear of the screen plate provided with the screen on a surface of which an image is reflected and scattered, the rotary supporter that rotates left/rightward is provided on the support plate, and the rotating fixing plate that rotates vertically is provided inside the rotary supporter. Here, the screen plate and the support plate provided on a rear of the screen plate are prepared with different materials and thus the screen can be designed with various colors.

Further, the screen is prepared as a reflection type front screen, a surface of which is formed as a scattering surface and a rear surface of which is formed as a reflection surface, and the scattering surface is made of material having 1.6 or less of a refraction rate such as acryl, silicon, PVC or the like such that the polarized image can be reflected and thus the screen can be used for a 3D image.

Meanwhile, the bending line (e4) is provided vertically on a center of the support plate that is provided as a plurality such that the whole screen can be folded left/rightward and thus the relatively large area of the screen is reduced for convenient carrying.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 3 is a perspective view illustrating a support plate provided on a rear of a portable screen combined with a rotary supporter of the present invention;

FIG. 4 is a perspective view illustrating a portable screen combined with a rotary supporter of the present invention;

FIG. 5(a) is a perspective view illustrating a support plate that is folded a flat surface according to an embodiment of the present invention;

FIG. 5(b) is a perspective view illustrating a support plate that is rotated according to an embodiment of the present invention;

FIG. 8 is a perspective view illustrating a plurality of support plates that are folded according to an embodiment of the present invention; and FIG. 9 is a perspective view illustrating a screen that is bent along a bending line according to an embodiment of the present invention.

Figure 1:
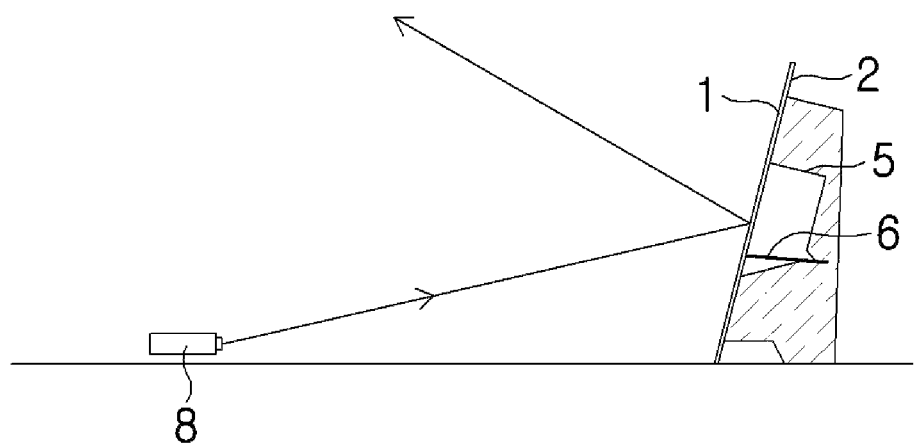
FIG. 1 is a front perspective view illustrating a portable screen combined with a rotary supporter of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Exemplary embodiments of the present invention will be described below in detail with reference to the accompanying drawings. Wherever possible, the same reference numerals will be used to refer to the same elements throughout the specification, and a duplicated description thereof will be omitted.

As shown in FIG. 3, a screen 2 formed on a front of a screen plate 2, not limited thereof, which is made of a film or a white mat material prepared by deposing or applying aluminum on polyester, PVC, PE, acryl, PC, PP urethane or the like, and a thickness of the screen may be 5 micron-500 micron.

The screen plate on which the screen 1 is attached is made of plastic material which is easily molded such as acryl, PVC, or the like, which has a beautiful color and a thickness thereof may be 0.5 mm-5 mm.

As shown FIG. 3, a support plate 4 is arranged on a rear of the screen 1 in a knife shape which is attached/detached easily and a thickness thereof may be 0.5 mm to 7 mm. Here, the support plate may be made of plastic material such as PE, PP, urethane, silicon rubber or the like, which has a high tensile strength.

As shown in FIG. 5(a), a rotary supporter 5 that is rotated left/rightward is formed adjacently to the support plate 4 in a single plate type and bending lines e2, e3 and a rotation fixing plate 6 that is rotated vertically is formed inside the rotary supporter 5 by the support plate 4 and the bending line e1.

Further, a fixing groove c is formed through a support groove plate 7 inside the rotation fixing plate 6 and a support groove d is formed at a position to which the fixing groove c is rotated to be horizontal inside one side of the rotary supporter 5.

As shown in FIG. 5(a), a width a of the fixing groove c and a width b of the support groove d are formed to be equal-distance, based on the respective bending line e1, e3.

As shown in FIG. 5(b), when the rotary supporter 5 is rotated left/rightward and then the rotation fixing plate 6 inside the rotary supporter is rotated vertically, the fixing groove c of the rotary supporter 5 and the support groove d of the rotation fixing plate 6 are connected and fixed, thereby fixing stably the screen.

Figure 6A:
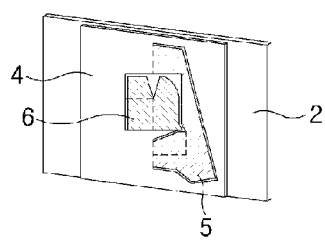
FIG. 6(a) is a perspective view illustrating a portable screen combined with a rotary supporter, which is formed as a thin film when it is carried, according to an embodiment of the present invention.
Figure 6B:
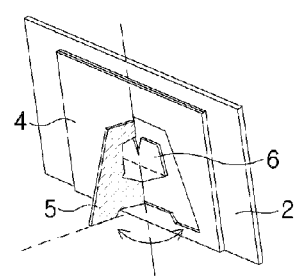
FIG. 6(b) is a perspective view illustrating a rotary supporter that is rotated horizontally according to an embodiment of the present invention.
Figure 6C:
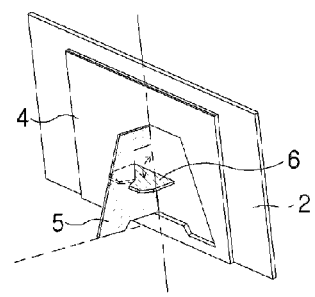
FIG. 6(c) is a perspective view illustrating a rotary supporter that is rotated vertically according to an embodiment of the present invention.

As shown in FIG. 1, the portable screen combined with rotary supper is erected on a front on a small micro projector 8 or on a mobile phone into which the micro small projector 8 is embedded to be used wherein when the rotary supporter 5 as shown in FIG. 6(a) which is provided on the support plate 4 on a rear of the screen plate 2 is rotated left/rightward as shown in FIG. 6(b) and further the rotation fixing plate 6 is rotated vertically as shown in FIG. 6(c), and the fixing groove c is fixed to the support groove d as shown in FIG. 5(b), the screen 1 is erected.

At this time, an angle of installing the screen 1 is important such that as shown in FIG. 5(b), the angle of installing the screen <b is determined depending on <a formed between a lower end of the screen and a lower part of the rotary supporter, as shown in FIG. 5(a). Accordingly, when the screen of the present invention is used as shown in FIGS. 6(a), 6(b), the rotary supporter is rotated left/rightward and the rotation fixing plate 6 is rotated vertically, and the rotary supporter 5 together with the screen is erected, and when carrying the screen, on the contrary, the rotation fixing plate 6 is folded vertically and again the rotary supporter 5 is folded left/rightward, the screen of the present invention is to be a thin film structure as shown in FIG. 6(a).

Specially, a thickness of the thin film structure of the screen is within two times the thickness of the screen plate 2 since the rotary supporter 5 and the rotation fixing plate are formed within the thickness of the screen plate 2.

[Embodiment 1]

The screen plate 2 may be formed differently in color and material from the support plate 4 to form a beautiful screen wherein the screen plate 2 to which a beautiful screen is attached is formed differently in material and color from the support plate 4 on which the rotary supporter 5 and the rotation fixing plate 6 are formed.

That is, the support plate 4 as shown in FIG. 5(a) that is prepared separately is connected to a rear of the screen plate 2 as shown in FIG. 4. According to the embodiment, for example, the screen plate 2 is made of plastic material or metal having elegant color and material feeling such as acryl and polycarbonate and the support plate 4 on a rear of the screen plate is made of plastic material having a high tensile strength such as PP, PE.

Accordingly, the screen plate can be mass-manufactured with a simple process and the support plate 4 can be prepared through one process simultaneously with the rotary supporter 5, the rotating fixing plate 6 and the bending lines e1, e2, e3 so that the portable screen combined with a rotary supporter of the present invention can be mass-manufactured efficiently.

[Embodiment 2]

Figure 7:
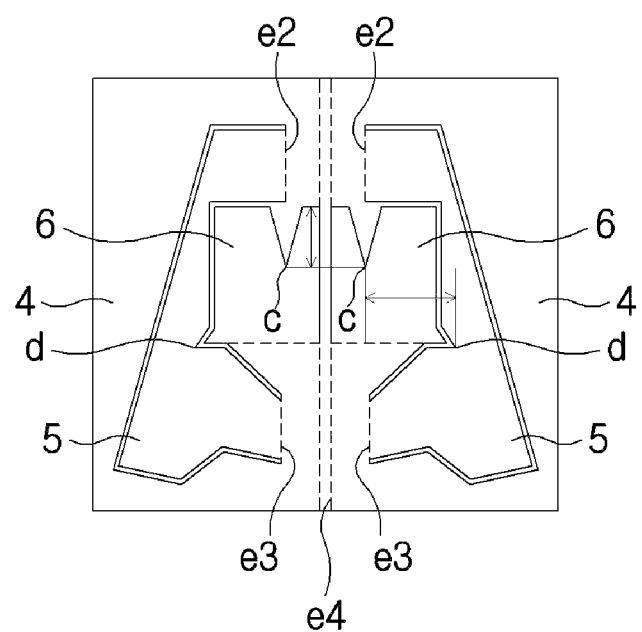
FIG. 7 is a perspective view illustrating a support plate that is provided as a plurality according to an embodiment of the present invention.

According to the present invention, as shown FIGS. 7 and 8, the support plate 4 may be prepared as a pair. This structure of the support plate is proper for a relatively large screen that is used in a large mobile phone wherein the support plate 4 is provided with the rotary supporter 5 and the rotation fixing plate 6 prepared left/right-symmetrically and the configuration, using method and effects thereof are the same as Embodiment 1.

[Embodiment 3]

Figure 2:
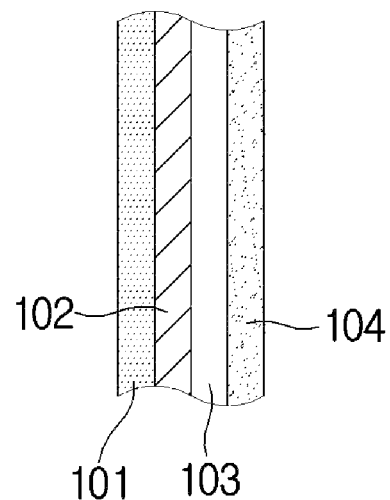
FIG. 2 is a cross-sectional view illustrating a portable screen combined with a rotary supporter of the present invention.

As shown in FIG. 2, the screen may be made of metal or film material wherein a scattering surface 101 is provide on a surface of the screen, a reflection surface 102 is provided on a rear of the scattering surface 101 and a film 103 and an attaching surface 104 is provided on a rear of the film 3. In this case, the white mat surface itself may be used as a screen surface.

However, according to the present invention, the screen is configured as a front screen such as a reflection type screen on a surface of which an image is reflected or scattered, as in the present embodiment.

[Embodiment 4]

The screen is configured as a polarization reflection 3D image, when the scattering surface on the screen is made of material having less than 1.6 of a refraction rate such as PVC, acryl resin, silicon or the like.

That is, when the scattering surface 101 is made of material having 1.6 or more of a refraction rate, the polarization degree of the 3D image polarized is dispersed and thus it is impossible to implement a 3D image.

[Embodiment 5]

As seen in FIG. 9, the screen plate 2 and the support plate 4 may be formed adjacently on the bending line 3 as one flat structure. According to the flat structure of the present embodiment, it is useful for the structure where the screen plate 2 and the support plate are same in color, and further the screen 1, the screen plate 2, the bending line 3, the support plate 4, the rotary supporter 5, and the rotation fixing plate 6 are all prepared through one press process using one flat material, thereby saving cost and mass-manufacturing thereof.

According to the present invention, a portable screen combined with rotary supporter is configured simply and weight-lighted and thus it can be installed simply, and further it can be a thin-film structure when the screen is carried and thus it can be carried conveniently. Further, the rotary supporter 5 supported by the rotation fixing plate 5 is supported stably by an angle of installing the screen. Meanwhile, the screen plate 2 and the support plate 4 are made of different materials and then are connected, if necessary, so that beautiful appearance color of the screen can be implemented.

According to the portable screen combined with a rotary supporter of the present invention, the support plate 4, the rotary supporter 5 and the rotation fixing plate 6 are manufactured through one process when it is manufactured, and the screen is erected when it is used, and becomes a thin-film structure when it is carried.

Meanwhile, according to the portable screen combined with rotary supporter of the present invention, the rotary supporter that is rotated left/rightward and the rotation fixing plate that is rotated vertically are provided on a screen plate and thus the rotary supporter that is rotated left/rightward and the rotation fixing plate that is rotated vertically can be prepared on one screen plate through one process, thereby saving cost.

Here, the rotary supporter that is rotated left/rightward is supported stably by the rotation fixing plate that is rotated vertically, thereby supporting stably the screen.

Further, according to the portable screen combined with a rotary supporter of the present invention, the rotary supporter that is rotated left/rightward and the rotation fixing plate that is rotated vertically are connected and disconnected through rotating them without separate processes, thereby installing and uninstalling easily and simply the screen.

Further, according to the portable screen combined with rotary supporter of the present invention, the screen plate is made of plastic having a beautiful color such as acryl, the rotary supporter is attached separately thereto, the screen is made of different material having beautiful color and then the support plate can be attached to a rear of the screen, thereby implementing various color and designs.

Meanwhile, comparing to a related art of Korean Patent Application No. 10-2008-0080749, wherein it needs to go through several procedures for erecting or carrying the screen, however, according to the present invention, the rotary supporter is rotated to be fixed to the rotation fixing plate, thereby installing the screen simply and carrying conveniently the screen.

Further, according to the present invention, the needed material area can be reduced to ½ or less and cost for manufacturing can be reduced ½ or less based on the screen and further weight of the screen can be reduce ½ or less, thereby carrying simple the screen.

The scattering surface is provided on a surface of the screen and the reflection surface is provided on a rear of the screen wherein the scattering surface is made of acryl, silicon, PVC or the like having 1.6 or more of a refraction rate such that the polarized image can be reflected, and thus the screen can be used for a 3D image screen.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A portable screen combined with a rotary supporter, comprising:
    a film screen;
    a screen plate made of one of acryl and PVC having a surface on which the film screen is provided;
    a rotary supporter; and
    a rotation fixing plate which is provided with a fixing groove and configured to rotate vertically,
    wherein a support groove has the same length as a distance between the fixing groove and a bending line,
    a support plate made of one of polyethylene, polypropylene, urethane, and silicon rubber and having a strong tensile strength, wherein the support plate consists of the rotary supporter and wherein the rotary supporter is provided as a single plate, and
    wherein the screen plate and the support plate are combinable to obtain simultaneously different effects of the screen plate and the strong tensile strength of the support plate.

2. The portable screen combined with rotary supporter of claim 1, wherein the screen plate and the support plate on which the rotary supporter and the rotation fixing plate are provided are prepared from different materials.

3. The portable screen combined with rotary supporter of claim 1, wherein the screen plate and the support plate on which the rotary supporter and the rotation fixing plate are provided form the screen as one structure by the bending line.

4. The portable screen combined with rotary supporter of claim 1, wherein a surface of the screen is prepared with a material having 1.6 or less of a refraction rate as a polarization reflection 3D screen.

5. A portable screen combined with a rotary supporter, comprising:
    a front screen on which an image is reflected and scattered;

a screen plate comprising at least one of acryl and PVC on which the front screen is provided;

a support plate which is provided on a rear of the screen plate to erect the screen plate to be used;

a rotary supporter which is arranged on one surface of the support plate and comprises a support groove and is configured to rotate left/rightward to arrange stably the screen plate; and a rotation fixing plate which is provided on one surface of the support plate and rotates vertically, and comprises a fixing groove and is configured to rotate vertically, wherein the support groove has a same length as a distance between the fixing groove and a bending line, a support plate made of one of polyethylene, polypropylene, urethane, and silicon rubber and having a strong tensile strength, wherein the support plate consists of the rotary supporter and wherein the rotary supporter is provided as a single plate, and wherein when the rotary supporter is rotated left/rightward and the rotation fixing plate is rotated vertically, the rotary supporter is connected to the rotation fixing plate by connecting the fixing groove and the support groove such that when using the portable screen the screen plate is able to be arranged stably, and the rotation fixing plate is able to be separated from the rotary supporter when using the portable screen such that the portable screen becomes portable as a thin structure.

* * * * *